United States Patent
Takebayashi

(10) Patent No.: US 6,572,281 B2
(45) Date of Patent: Jun. 3, 2003

(54) FILM WINDING-REWINDING APPARATUS FOR A CAMERA

(75) Inventor: Tatsuhide Takebayashi, Tokyo (JP)

(73) Assignee: Pentax Corporation, Tokyo (JP)

(*) Notice: Subject to any disclaimer, the term of this patent is extended or adjusted under 35 U.S.C. 154(b) by 0 days.

(21) Appl. No.: 10/097,373

(22) Filed: Mar. 15, 2002

(65) Prior Publication Data

US 2002/0131779 A1 Sep. 19, 2002

(30) Foreign Application Priority Data

Mar. 16, 2001 (JP) ........................................ 2001-076096

(51) Int. Cl.[7] ................................................. G03B 1/00
(52) U.S. Cl. .......................................................... 396/413
(58) Field of Search ................................ 396/411, 413, 396/418

(56) References Cited

U.S. PATENT DOCUMENTS 4,506,965 A * 3/1985 Kitajima et al. ............. 396/413
4,821,059 A * 4/1989 Nakanishi et al. ........... 396/413
4,967,213 A * 10/1990 Han ............................. 396/413
5,075,707 A * 12/1991 Shibayama et al. .......... 396/411
5,823,454 A * 10/1998 Erck ............................ 396/413
5,911,088 A * 6/1999 Higashihara et al. ........ 396/387

* cited by examiner

Primary Examiner—Christopher Mahoney
(74) Attorney, Agent, or Firm—Greenblum & Bernstein, P.L.C.

(57) ABSTRACT

A film winding-rewinding apparatus for a camera comprises a driving pulley, a driven pulley and an endless belt, a rewinding fork, a winding spool, a selective transmission mechanism, and an idler. The driving pulley is attached to a reversible motor. The belt is tensioned around the driving pulley and the driven pulleys. The rewinding fork engages with the spool of a film cartridge and the film is wound by the winding spool. The transmission mechanism transmits drive power to the winding spool or the rewinding fork. When the motor is driven in the positive direction, the power is transmitted to the winding spool, and when it is driven in the negative direction, the power is transmitted to the rewinding fork. The idler is disposed in the vicinity of the belt and engages with a side of the belt which is loosened when the motor is driven in the negative direction.

4 Claims, 10 Drawing Sheets

FILM WINDING-REWINDING APPARATUS FOR A CAMERA

BACKGROUND OF THE INVENTION

1. Field of the Invention

The present invention relates to an apparatus for a camera that winds or rewinds a film by using a reversible motor.

2. Description of the Related Art

A film winding-rewinding apparatus for a camera that utilizes an endless belt (a timing belt) for a first driving step, is conventionally proposed for noise reduction. However, the oscillations induced in the driving mechanism are not sufficiently reduced by using an endless belt alone, therefore noise reduction with an endless belt alone is insufficient. Further, for guiding an endless belt, and for preventing dislocation of the endless belt from the pulleys, flanges are necessarily provided for each side of the pulleys, so that assembly of the driving mechanism is complex and cumbersome.

SUMMARY OF THE INVENTION

Therefore, an object of the present invention is to provide a film winding-rewinding apparatus that has advantages in noise reduction. Further, another object of the present invention is to provide a film winding-rewinding apparatus that prevents belt dislocation while improving assembly.

According to the present invention, a film winding-rewinding apparatus for a camera is provided that comprises a driving pulley, a driven pulley, an endless belt, a rewinding fork, a winding spool, a selective transmission mechanism, and an idler.

The driving pulley is attached to a shaft of a reversible motor and the endless belt is tensioned around the driving pulley and the driven pulley, so that the driving pulley drives the driven pulley. The rewinding fork engages with a spool of a film cartridge for rewinding the film, which is extended from the film cartridge, and a winding spool is provided for winding the film. The selective transmission mechanism alternatively transmits drive power from the driven pulley to the winding spool when the reversible motor is driven in a positive direction, and to the rewinding fork when the reversible motor is driven in a negative direction. The idler is disposed in the vicinity of the endless belt and engages with a side of the endless belt which is loosened when the reversible motor is driven in the negative direction, so that the idler gives tension to the endless belt.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
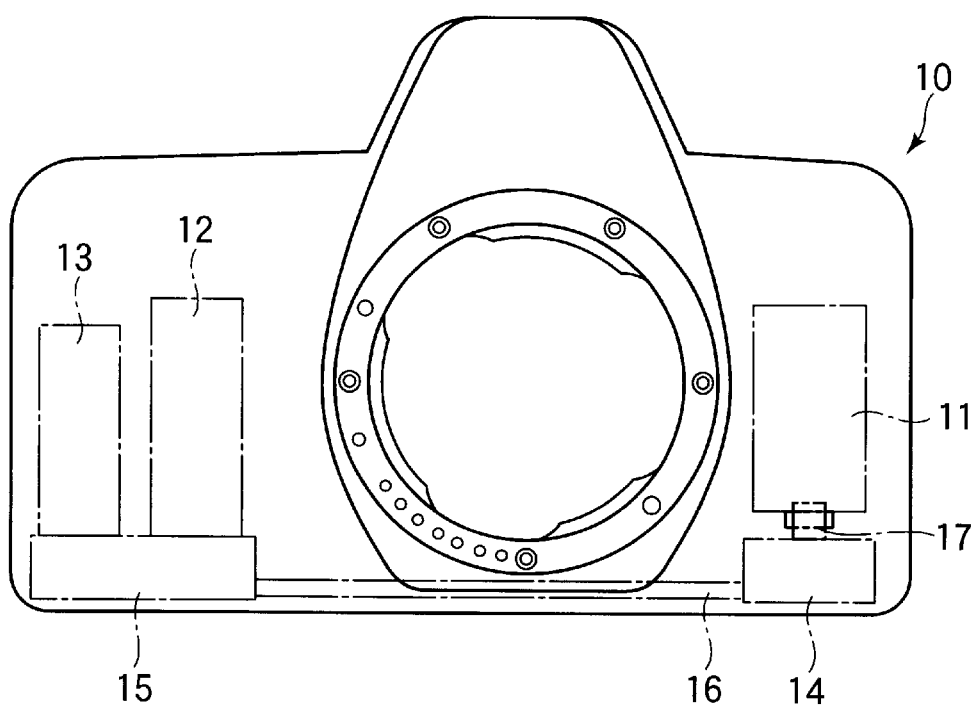
FIG. 1 schematically illustrates the front view of a camera comprising a film winding-rewinding apparatus of an embodiment to which of the present invention is applied.

The present invention is described below with reference to the embodiments shown in the drawings.

FIG. 1 through FIG. 7 illustrate a first embodiment of a film winding-rewinding apparatus provided for a camera for which the present invention is applied. As shown in FIG. 1, inside the camera body 10, a film cartridge room 11 and a film spool room 12 are arranged on the right and left side of the camera. On the left side of the film spool room 12, a reversible motor 13 is disposed with its driving shaft parallel to the longitudinal direction of the film spool room 12. Beneath the film cartridge room 11, a rewinding fork block 14 is arranged. Beneath the reversible motor 13, a driving gear train (speed reduction mechanism) 15 is disposed. Between the rewinding fork block 14 and the driving gear train 15, a rewinding toothed endless belt 16 for a rewinding-power transmission mechanism is arranged. The belt 16 links the rewinding fork block 14 and the driving gear train 15. The rewinding fork block 14 comprises a rewinding fork 17 which protrudes inside the film cartridge room 11 and engages with the spool of a film cartridge. Inside the rewinding spool room 12, a winding spool 18 (shown in FIGS. 3, 4) for winding a film, which is extended from a film cartridge, is provided. A gear 18g for a winding-power transmission mechanism is integrally formed with the winding spool 18 with its axis coaxial to the axis of the winding spool 18.

Figure 2:
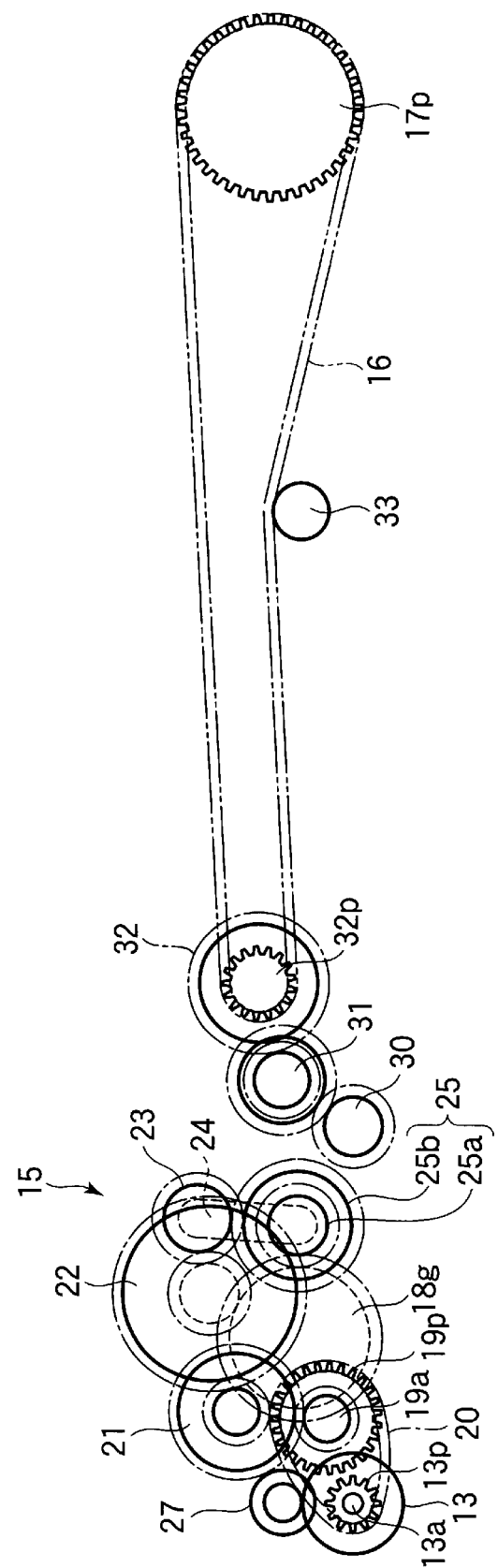
FIG. 2 is the plan view of the film winding-rewinding apparatus for a first embodiment of the present invention.
Figure 3:
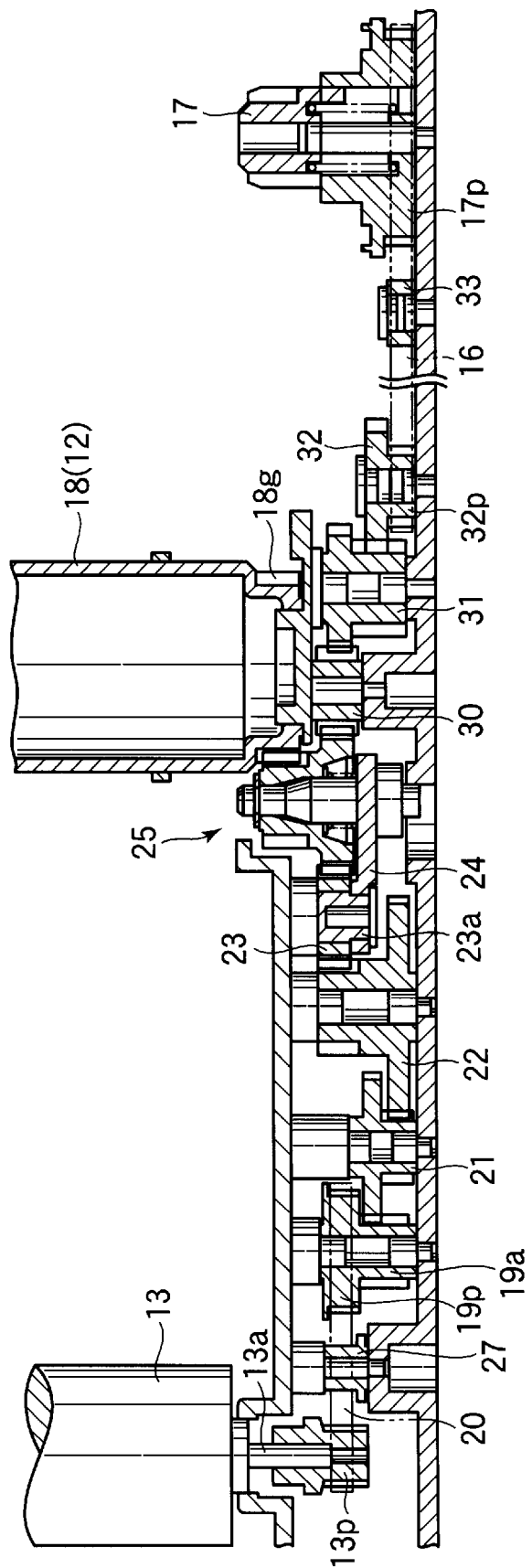
FIG. 3 is a longitudinal sectional view of the film winding-rewinding apparatus for the first embodiment shown in FIG. 2.
Figure 4:
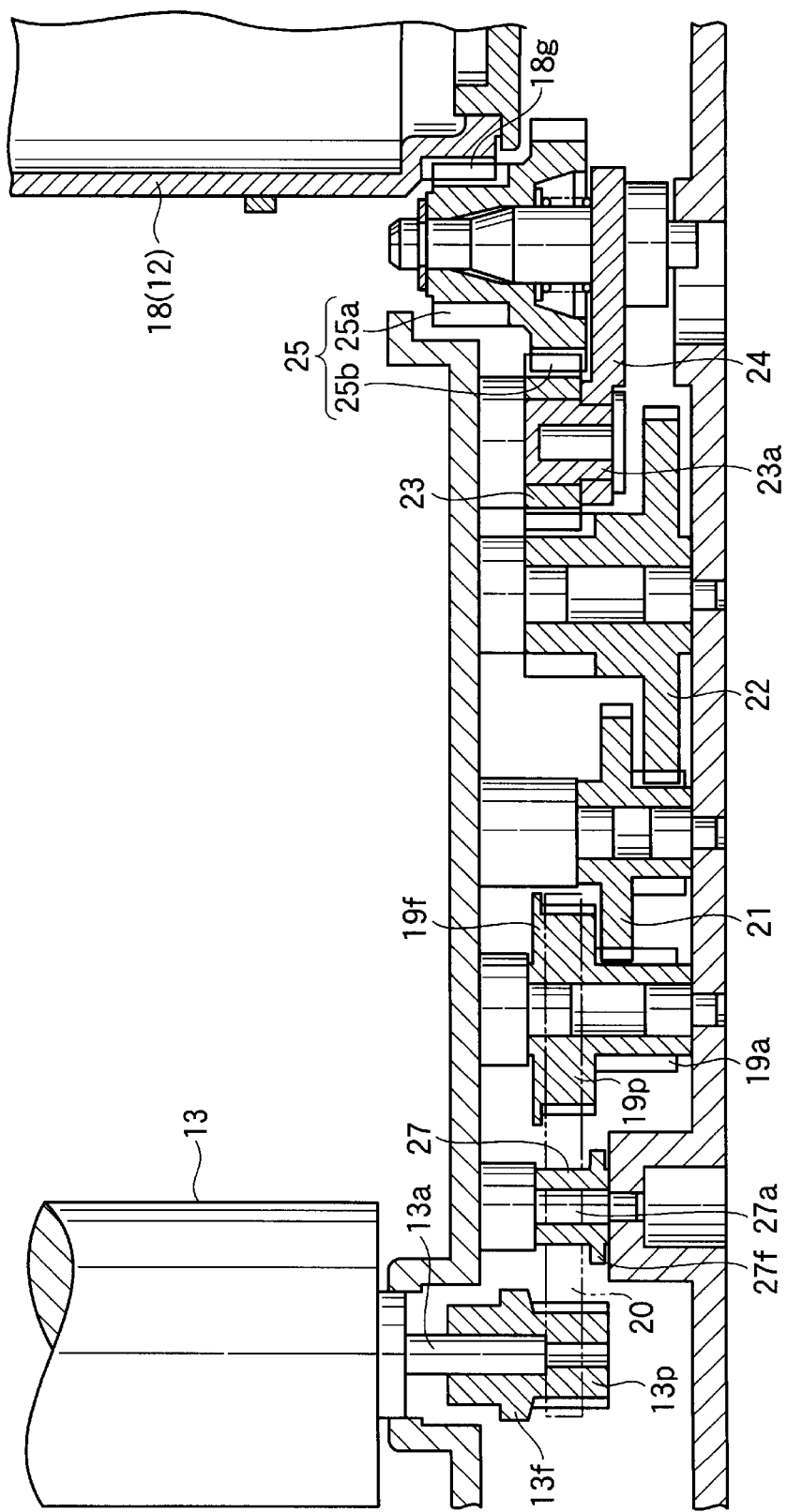
FIG. 4 partly shows an enlarged portion of FIG. 3.
Figure 5:
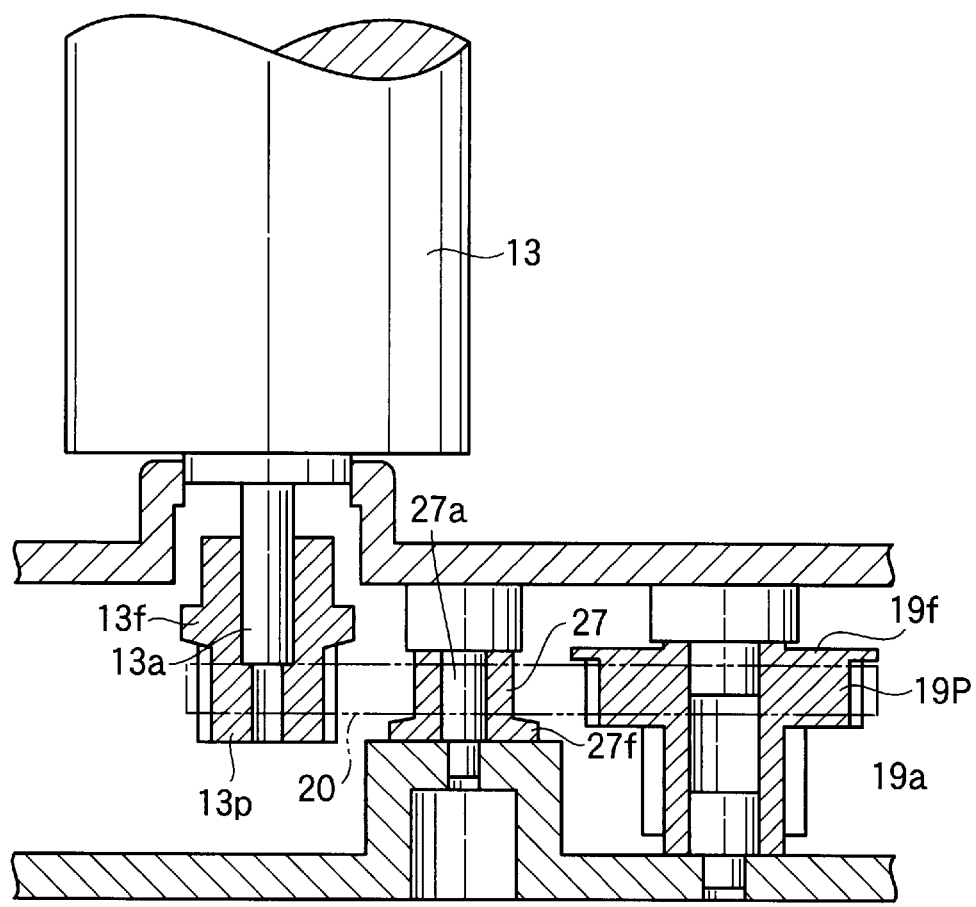
FIG. 5 partly shows an enlarged portion of FIG. 4.

As shown in FIG. 2 through FIG. 4, the driving gear train 15 comprises a driving toothed pulley (driving pulley) 13p, a driven toothed pulley (driven pulley) 19p and a toothed endless belt 20. The driving toothed pulley 13p is fixed to the axis of the reversible motor 13. The driven toothed pulley 19p is arranged parallel to the driving toothed pulley 13p. The toothed endless belt 20 is entrained and tensioned round the driving toothed pulley 13p and the driven toothed pulley 19p. A gear 19a is formed coaxial to the driven toothed pulley 19p and integrated with the pulley 19p. The gear 19a forms a gear train with a two-step gear 21, 22, and sun gear 23 in this order. The above power transmission mechanism, which transmits rotational power from the reversible motor 13 to the sun gear 23, is the main structure of the driving gear train 15.

The pivot 23a of the sun gear 23 is journalled on one end of a planet lever (selective transmission mechanism) 24. The planet lever 24 is frictionally engaged with the sun gear 23 and swings about the pivot 23a in direction according to the rotation of the sun gear 23. On the other end of the planet lever 24, a planet two-step gear 25 is journalled. The planet two-step gear comprises a small gear 25a and a big gear 25b which are coaxially attached. When the sun gear 23 or the reversible motor 13 is rotated in the direction for winding a film, the planet lever 24 swings about the pivot 23a, so that the small gear 25a engages with the gear 18a of the winding spool 18 (see FIG. 6).

The rewinding power transmission mechanism that gives rotation to the rewinding fork 17 is comprised of a gear 30, a two-step gear 31, a toothed pulley 32p, a toothed endless belt 16 and idling roller (idler) 33. The big gear 25b of the planet two-step gear 25 contacts or separates from the gear 30 depending on the direction in which the planet lever 24 swings about the pivot 23a. The gear 32 and the toothed pulley 32p are fixed coaxially and the toothed endless belt 16 is tensioned around the toothed pulley 32p and the toothed pulley 17p, which is coaxial and integrated with the rewinding fork 17. The idling roller 33 gives tension to the toothed endless belt 16. When the sun gear 23 or the reversible motor 13 is rotated in the direction for rewinding a film, the direction which corresponds to the reverse of the direction for winding a film, the planet lever 24 swings about the pivot 23a, so that the gear 30 engages the big gear 25b of the planet two-step gear 25 (see FIG. 7).

Figure 6:
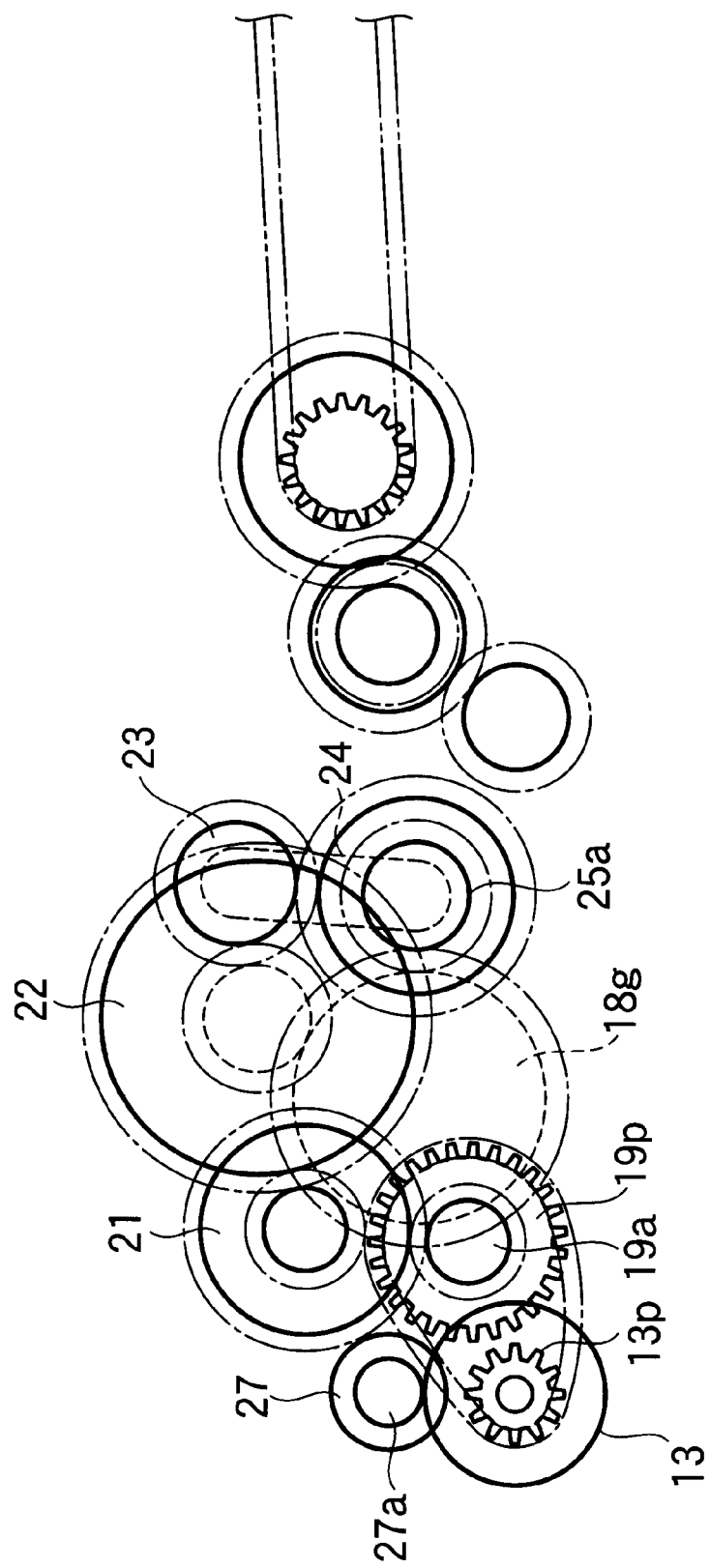
FIG. 6 is a plan view which illustrates the winding state of the film winding-rewinding apparatus in FIG. 2.
Figure 7:
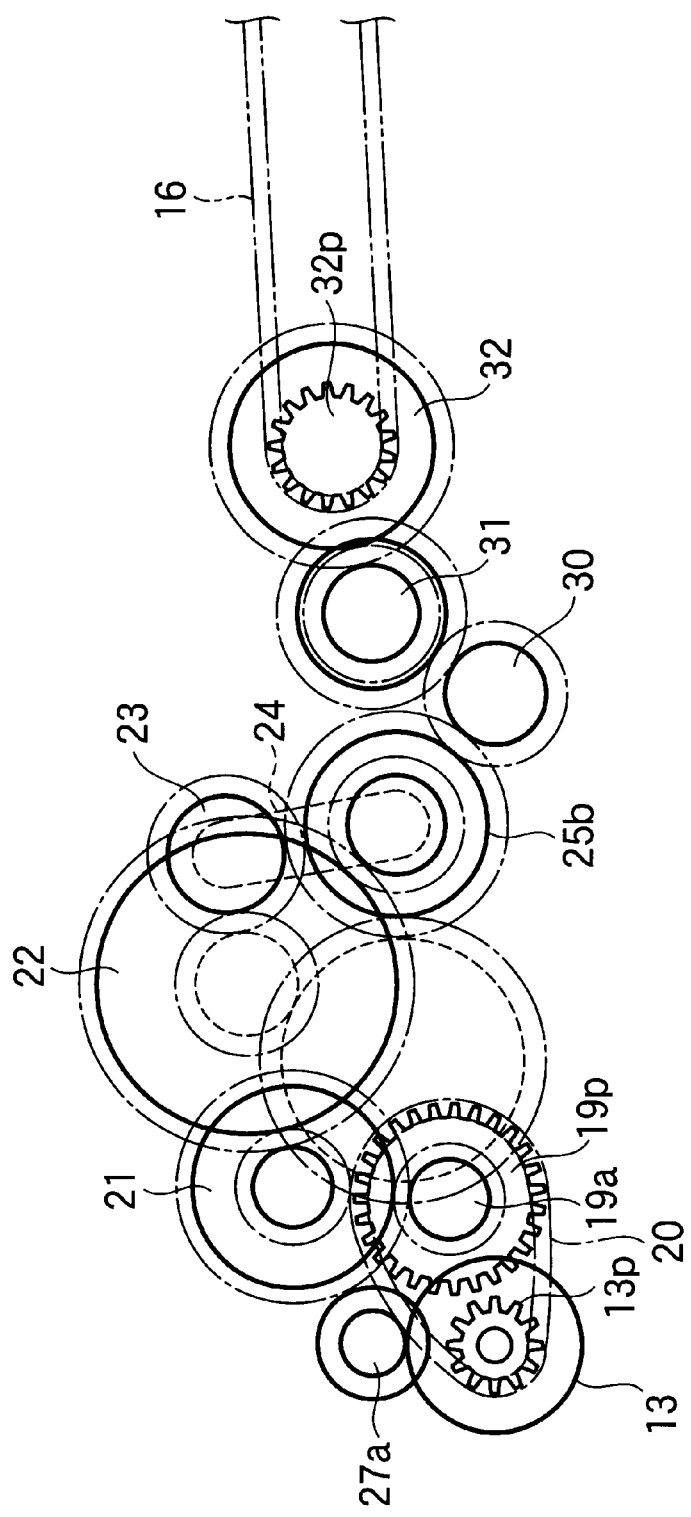
FIG. 7 is a plan view which illustrates the rewinding state of the film winding-rewinding apparatus in FIG. 2.

In the above construction, the toothed endless belt 20 is entrained and tensioned around the driving toothed pulley 13p and the driven toothed pulley 19p, and when the reversible motor 13 is driven, a leading side (loosened side) of the toothed endless belt 20 adjacent to the driving toothed pulley 13p is loosened while the trailing side (strained side) of the toothed endless belt 20 adjacent to the driving toothed pulley 13p is strained. FIG. 2 illustrates a state when the reversible motor 13 is settled, FIG. 6 illustrates a state when the reversible motor 13 is driven in the film winding direction, and FIG. 7 illustrates a state when the reversible motor 13 is reversed and is driven in the film rewinding direction. In the present embodiment, the idling roller 27, which is rotatable about the pivot 27a, is provided so as to engage the loosened side of the toothed endless belt 20 during the film rewinding operation. As it is obvious from FIG. 5, a flange 27f which engages with one side of the toothed endless belt 20 is formed on the idling roller 27. The flange 13f and flange 19f which engage the other side of the toothed endless belt 20, are formed on the driving toothed pulley 13p and the driven toothed pulley 19p, respectively. The idling roller 27 contacts the toothed endless belt 20 when the film is being rewound and the reversible motor 13 is driven in the film rewinding direction (see FIG. 7). When the film is being wound and the reversible motor 13 is driven in the film winding direction, the idling roller 27 does not contact the toothed endless belt 20.

Therefore, with the construction of the film winding-rewinding apparatus described above, the winding spool 18 is rotated in the film winding direction when the reversible motor 13 is driven in the positive direction (the film winding direction), as shown in FIG. 6. At this time, the rotating power from the reversible motor 13 is transmitted to the small gear 18g via the driving toothed pulley 13p, the toothed endless belt 20, the driven toothed pulley 19p, the gear 19a, the two-step gear 21, 22, the sun gear 23, and the small gear 25a. On the other hand, as shown in FIG. 7, when the reversible motor 13 is reversed from the positive direction and is driven in the negative direction (the film rewinding direction), the rewinding fork 17 is rotated in the film rewinding direction, so that the rotating power from the reversible motor 13 is transmitted to the toothed pulley 17p via the driving toothed pulley 13p, the toothed endless belt 20, the driven toothed pulley 19p, the gear 19a, the two-step gear 21, 22, the sun gear 23, the big gear 25b, the gear 30, two-step gear 31, the gear 32, toothed pulley 32p, and the rewinding toothed endless belt 16.

When a film is being rewound or the reversible motor 13 is driven in the negative direction, the idling roller 27 engages the loosened side of the toothed endless belt 20 and reduces vibration of the toothed endless belt 20. As the result, noise which is caused by the vibration of the toothed endless belt 20 is reduced. As already mentioned, the film rewinding operation takes a long time to complete compared to the film winding operation. Therefore, for noise reduction, it is quite effective to reduce vibration of the toothed endless belt 20 during the film rewinding operation. Further, the sideways movement of the toothed endless belt 20 in one direction is restricted by the flange 13f of the driving toothed pulley 13p and the flange 19f of the driven toothed pulley 19p, and the sideways movement of the toothed endless belt 20 in another direction is restricted by the flange 27f of the idling roller 27, so that detrainment of the toothed endless belt 20 from the pulleys 13p and 19p is prevented during the film rewinding operation. However, only one side of each pulley 13p and 19p is provided with the flange 13f and 19f, so that it has an advantage in assembly when compared to pulleys for which flanges are provided on each side.

Figure 8:
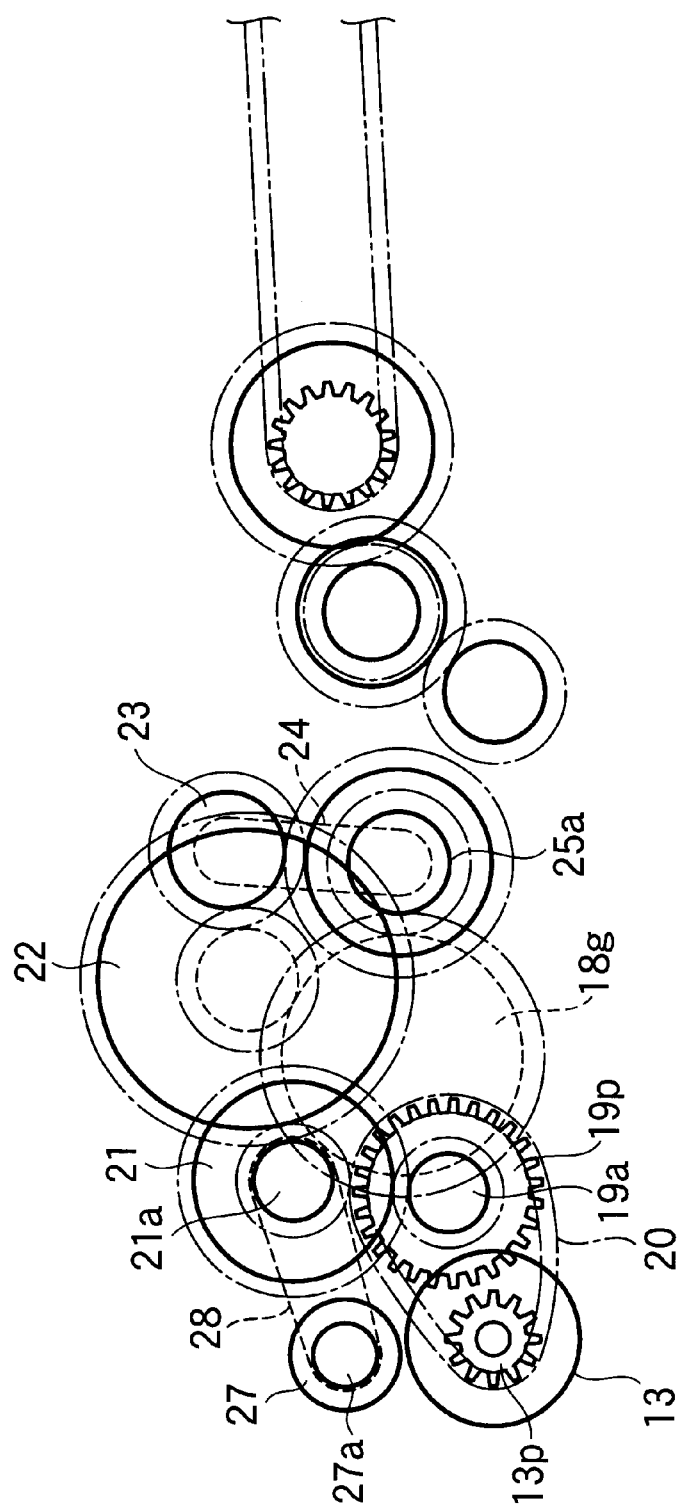
FIG. 8 is a plan view of the film winding-rewinding apparatus for a second embodiment of the present invention, showing the winding state of the apparatus.
Figure 9:
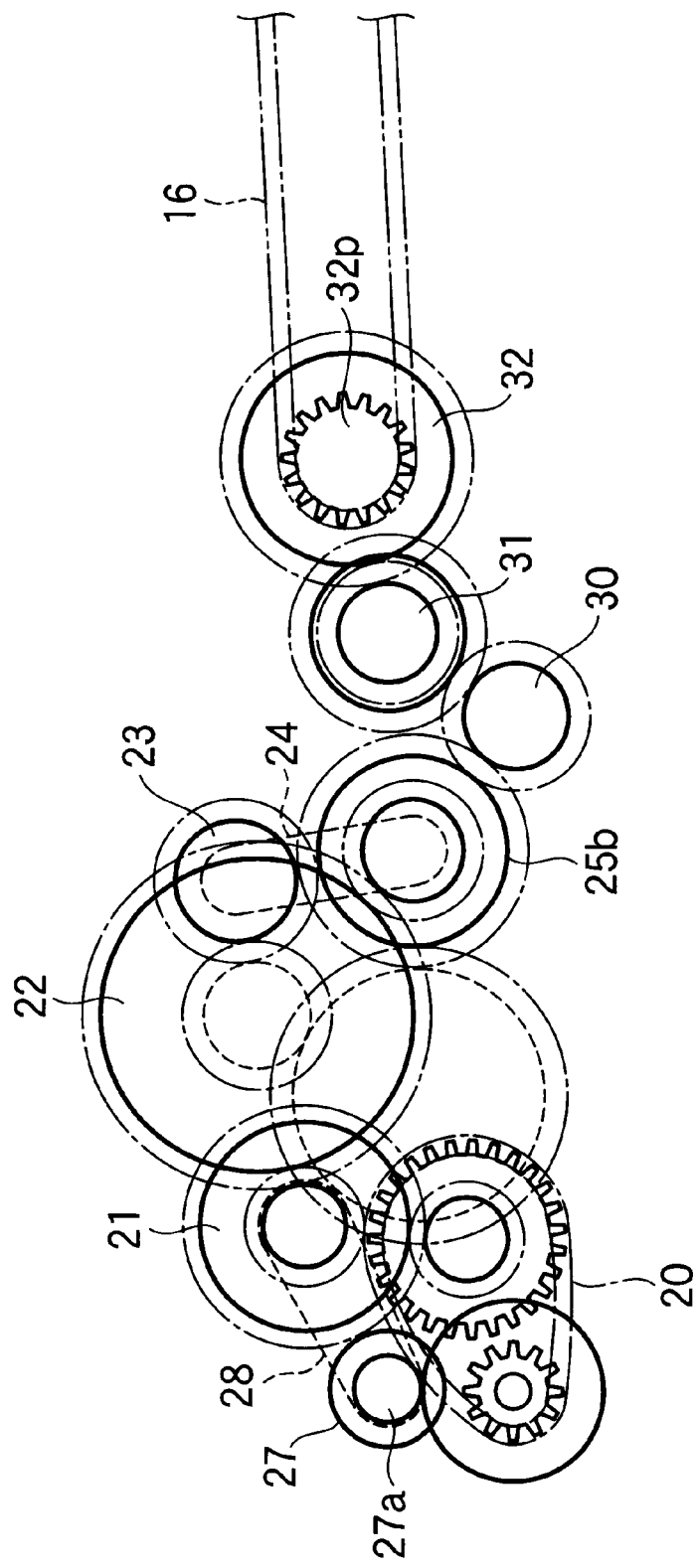
FIG. 9 is plan view which illustrates the rewinding state of the film winding-rewinding apparatus of the second embodiment.
Figure 10:
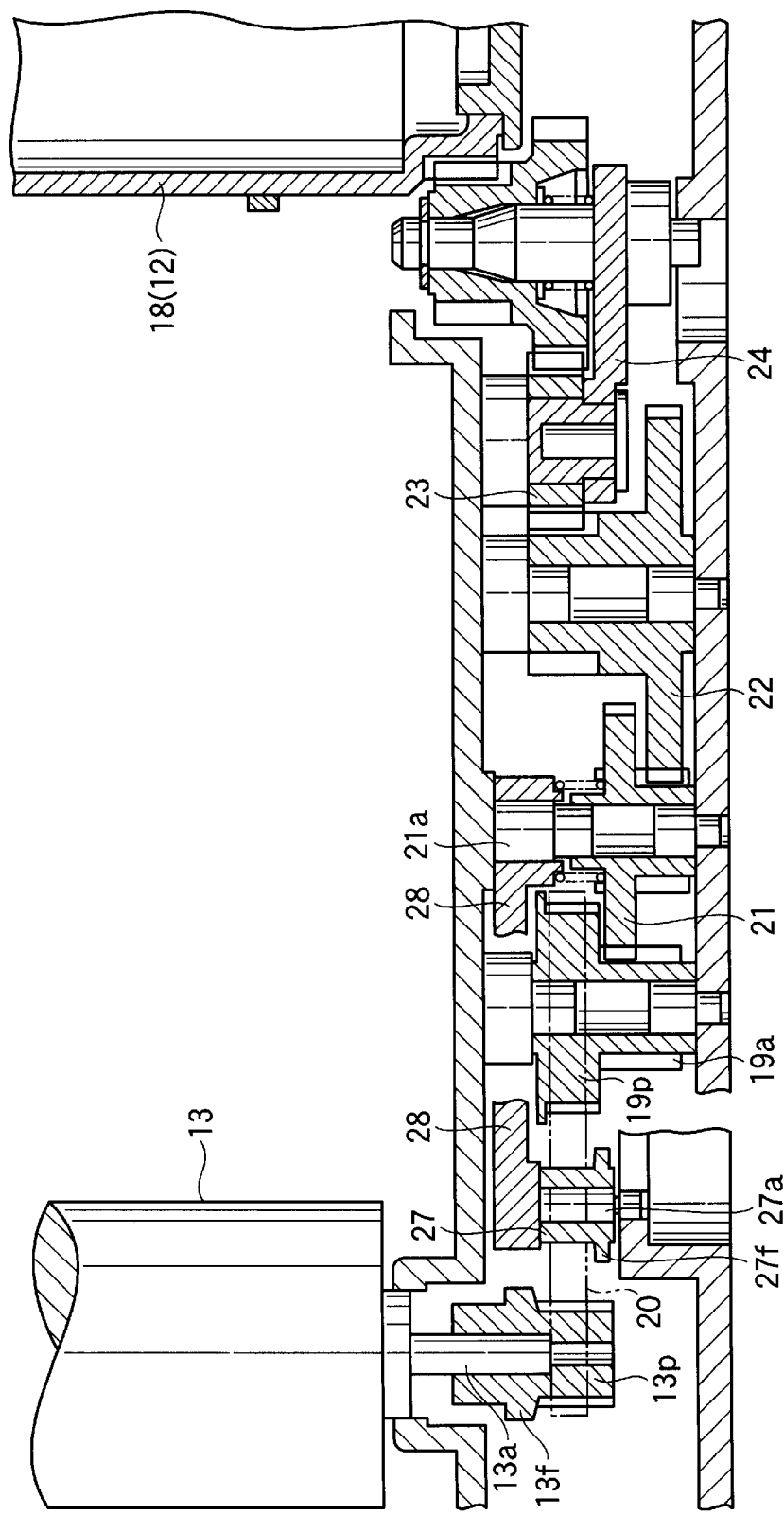
FIG. 10 is a longitudinal sectional view of the film winding-rewinding apparatus of the second embodiment shown in FIGS. 8 and 9.

FIGS. 8 through 10 illustrate another preferable embodiment (second embodiment) of the present invention. In the second embodiment, the axis 21a of the two-step gear 21 is journalled on one end of a planet lever 28. On the other end of the planet lever 28, the idling roller 27 is attached with a pivot 27a secured to the planet lever 28. The planet lever 28 is frictionally engaged with the two-step gear 21 and swings about the pivot 21a in accordance with the rotational direction of the two-step gear 21 or the reversible motor 13. Namely, as illustrated in FIG. 8, when the reversible motor 13 or the two-step gear 21 is driven in the film rewinding direction, the planet lever 28 is swung about the pivot 21a in the counterclockwise direction, so that the idling roller 27 is moved to a position where it is not in contact with the toothed endless belt 20. On the other hand, when the reversible motor 13 or the two-step gear 21 is driven in the film winding direction, the planet lever 20 is swung about the pivot 21a in the clockwise direction, so that the idling roller 27 is moved to the position in which the idling roller 27 contacts the toothed endless belt 20. The other constructions of the film winding-rewinding apparatus of the second embodiment are the same as those in the first embodiment, including the structure relating to a flange 27f formed on the idling roller 27.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-076096 (filed on Mar. 16, 2001) which is expressly incorporated herein, by reference, in its entirety.

What is claimed is:

1. A film winding-rewinding apparatus for a camera, comprising:

a driving pulley that is attached to a shaft of a reversible motor;

a driven pulley that is driven by said driving pulley;

an endless belt that is tensioned around said driving pulley and said driven pulley;

a rewinding fork that rewinds a film that extends from a film cartridge by engaging with a spool of the film cartridge;

a winding spool that winds said film that extends from the film cartridge;

a selective transmission mechanism that alternatively transmits drive power from said driven pulley to said winding spool when said reversible motor is driven in a positive direction and to said rewinding fork when said reversible motor is driven in a negative direction; and an idler that is disposed in the vicinity of said endless belt, that engages with a side of said endless belt which is loosened when said reversible motor is driven in said negative direction, and that is disengaged from said endless belt when said reversible motor is driven in the positive direction.

2. A film winding-rewinding apparatus according to claim 1, wherein said idler is attached to a fixed position.

3. A film winding-rewinding apparatus according to claim 1, wherein the position of said idler is movable between a first position where said idler contacts with said loosened side of said endless belt and a second position where said idler is spaced from said loosened side of said endless belt, and wherein said idler is moved by a planet gear mechanism to said first position when said reversible motor is driven in said negative direction and wherein said idler is moved by the planet gear mechanism to said second position when said reversible motor is driven in said positive direction.

4. A film winding-rewinding apparatus according to claim 1, wherein each of said driving pulley, said driven pulley, and said idler is formed with a flange on one side thereof; and said flanges of said driving pulley and said driven pulley engage with one side of said endless belt while said flange of said idler engages with the other side of said endless belt, so that said flanges prevent detrainment of said endless belt from said driving and driven pulleys.

* * * * *